US011831707B2

(12) United States Patent
Parikh et al.

(10) Patent No.: US 11,831,707 B2
(45) Date of Patent: Nov. 28, 2023

(54) REDIRECT PROCESSING FOR CONTENT DELIVERY NETWORKS

(71) Applicant: Charter Communications Operating, LLC, St. Louis, MO (US)

(72) Inventors: Nikhil Parikh, Arvada, CO (US); Jason Donovan, Denver, CO (US); Chris Sammoury, Frederick, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 130 days.

(21) Appl. No.: 17/689,411

(22) Filed: Mar. 8, 2022

(65) Prior Publication Data

US 2023/0291795 A1 Sep. 14, 2023

(51) Int. Cl.
*H04L 67/1014* (2022.01)
*H04L 67/02* (2022.01)
*H04L 67/63* (2022.01)

(52) U.S. Cl.
CPC .......... *H04L 67/1014* (2013.01); *H04L 67/02* (2013.01); *H04L 67/63* (2022.05)

(58) Field of Classification Search
None
See application file for complete search history.

(56) References Cited

U.S. PATENT DOCUMENTS

| 6,785,704 B1* | 8/2004 | McCanne | H04L 67/101 |
| | | | 709/239 |
| 7,093,279 B2* | 8/2006 | Tretheway | H04L 63/166 |
| | | | 709/229 |
| 7,296,076 B1* | 11/2007 | Portolani | H04L 67/02 |
| | | | 709/227 |
| 7,385,978 B1* | 6/2008 | Yang | H04L 12/66 |
| | | | 370/473 |
| 7,954,144 B1* | 5/2011 | Ebrahimi | H04L 67/02 |
| | | | 709/227 |
| 9,015,233 B2* | 4/2015 | Maloo | H04L 67/1014 |
| | | | 709/203 |
| 9,288,282 B2* | 3/2016 | Maloo | H04L 67/1095 |
| 10,375,159 B2* | 8/2019 | McMullen | H04L 67/1023 |
| 10,505,787 B2* | 12/2019 | Danisik | H04L 41/0672 |
| 11,064,043 B2* | 7/2021 | Sayko | H04N 21/2343 |
| 11,750,718 B2* | 9/2023 | Levy Nahum | H04L 67/1001 |
| | | | 709/213 |

(Continued)

*Primary Examiner* — Backhean Tiv
(74) *Attorney, Agent, or Firm* — Mendelsohn Dunleavy, P.C.; Steve Mendelsohn

(57) ABSTRACT

In a system, a load balancer transmits, to a selected content origin node, a first content request based on a first request for first requested content received from a client node, the selected content origin node transmits, to the load balancer, a first response to the first content request, wherein the selected content origin node has the first requested content, and the load balancer transmits, to the client node, a first redirect message identifying the selected content origin node as having the first requested content without transmitting the first requested content to the client node. In some implementations, the selected content origin node transmits the first redirect message as the first response. In other implementations, the first response from the selected content origin node contains the first requested content, and the load balancer converts the first response into the first redirect message.

24 Claims, 3 Drawing Sheets

(56) References Cited

U.S. PATENT DOCUMENTS

| | | | | |
|---|---|---|---|---|
| 2002/0184368 A1* | 12/2002 | Wang | ............... | H04L 41/044 |
| | | | | 709/224 |
| 2014/0215059 A1* | 7/2014 | Astiz Lezaun | ..... | H04L 67/1008 |
| | | | | 709/224 |
| 2017/0099345 A1* | 4/2017 | Leach | ............... | G06F 11/00 |
| 2017/0318086 A1* | 11/2017 | McMullen | ............ | H04L 67/568 |
| 2020/0366592 A1* | 11/2020 | Ehrat | ............... | H04L 45/22 |

\* cited by examiner

REDIRECT PROCESSING FOR CONTENT DELIVERY NETWORKS

BACKGROUND

Field of the Disclosure

The present disclosure relates to load balancing in a content delivery network.

Description of the Related Art

This section introduces aspects that may help facilitate a better understanding of the disclosure. Accordingly, the statements of this section are to be read in this light and are not to be understood as admissions about what is prior art or what is not prior art.

In a conventional content delivery network, one or more and possibly many (typically distributed) client nodes access content stored on a number of different (distributed and/or centrally located) content origin nodes.

In order to avoid congestion due to accessing only a few of the content origin nodes over time, it is known to deploy one or more load balancers between the client nodes and the content origin nodes, where each load balancer attempts to distribute access more or less equitably (e.g., evenly) to the different content origin nodes.

When a load balancer receives a request from a particular client node for a particular instance of content, the load balancer executes an algorithm to select one of the content origin nodes to send the request to. Depending on the implementation, the selection algorithm may be a round robin or other suitable scheme for equitably distributing requests to different content origin nodes over time. Some conventional selection algorithms involve the application of a hashing function to a certain set of information contained in the content request received from the client node to determine which content origin node to select. Some load balancers query the different content origin nodes in background processing to ensure that the content origin nodes are available to handle content requests.

In any case, after the load balancer selects one of the content origin nodes, the load balancer forwards the client node's content request to that selected content origin node. If the content origin node contains the requested content, then the content origin node will respond by forwarding that content back to the load balancer, which then forwards the content to the client node.

In some implementations, each content origin node is aware of the location of each different instance of content. That is, for a given instance of content, even if a particular content origin node does not contain that content, then that content origin node will know which other content origin node(s) do contain that content. In some of those implementations, if the selected content origin node does not contain the requested content, then that content origin node sends back to the load balancer a redirect message that indicates a different content origin node that does contain that content. The load balancer then forwards the redirect message back to the client node. In some implementations, the client node can then send a request for the desired content directly to that different content origin node that does contain the requested content, in which case, that content origin node will send the requested content to the client node without that content traversing the load balancer that received the original request from the client node.

SUMMARY

One of the problems in the prior art is that, when a load balancer forwards a client node's content request to a content origin node that does contain the requested content, the requested content is transmitted from the content origin node to the client node via the load balancer. In some situations, this results in a significant burden on the processing performed by the load balancer and can result in undesirable levels of latency in the transmission of the requested content to the client node.

This problem in the prior art is addressed in accordance with the principles of the present disclosure by always redirecting client nodes to a content origin node that contains the requested content whether or not the content origin node originally selected by the load balancer contains the requested content. In this way, load balancers will not be overloaded by being involved in the actual transmissions of requested content from the content origin nodes to the client nodes.

In one embodiment, the present disclosure is a system comprising a plurality of content origin nodes, a load balancer, and a client node. The load balancer is configured to transmit, to a selected content origin node of the plurality, a first content request based on a first request for first requested content received from the client node; the selected content origin node is configured to transmit, to the load balancer, a first response to the first content request, wherein the selected content origin node has the first requested content; and the load balancer is configured to transmit, to the client node, a first redirect message identifying the selected content origin node as having the first requested content without transmitting the first requested content to the client node.

In some implementations, the selected content origin node is configured to transmit, to the load balancer, the first redirect message as the first response. In some of those implementations, the first request is an HTTP GET request received from the client node; the first content request is an HTTP HEAD request, wherein the load balancer is configured to convert the HTTP GET request into the HTTP HEAD request and send the HTTP HEAD request to the selected content origin node; and the first redirect message is an HTTP Redirect message transmitted from the selected content storage node to the load balancer.

In other implementations, the first response from the selected content origin node contains the first requested content, and the load balancer is configured to convert the first response into the first redirect message. In some of those implementations, the first request is an HTTP GET request received from the client node; the first content request is an HTTP HEAD request, wherein the load balancer is configured to convert the HTTP GET request into the HTTP HEAD request and send the HTTP HEAD request to the selected storage node; the first response is an HTTP 200 message received from the selected storage node; and the first redirect message is an HTTP Redirect message, wherein the load balancer is configured to convert the HTTP 200 message into the HTTP Redirect message and transmit the HTTP Redirect message to the client node.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
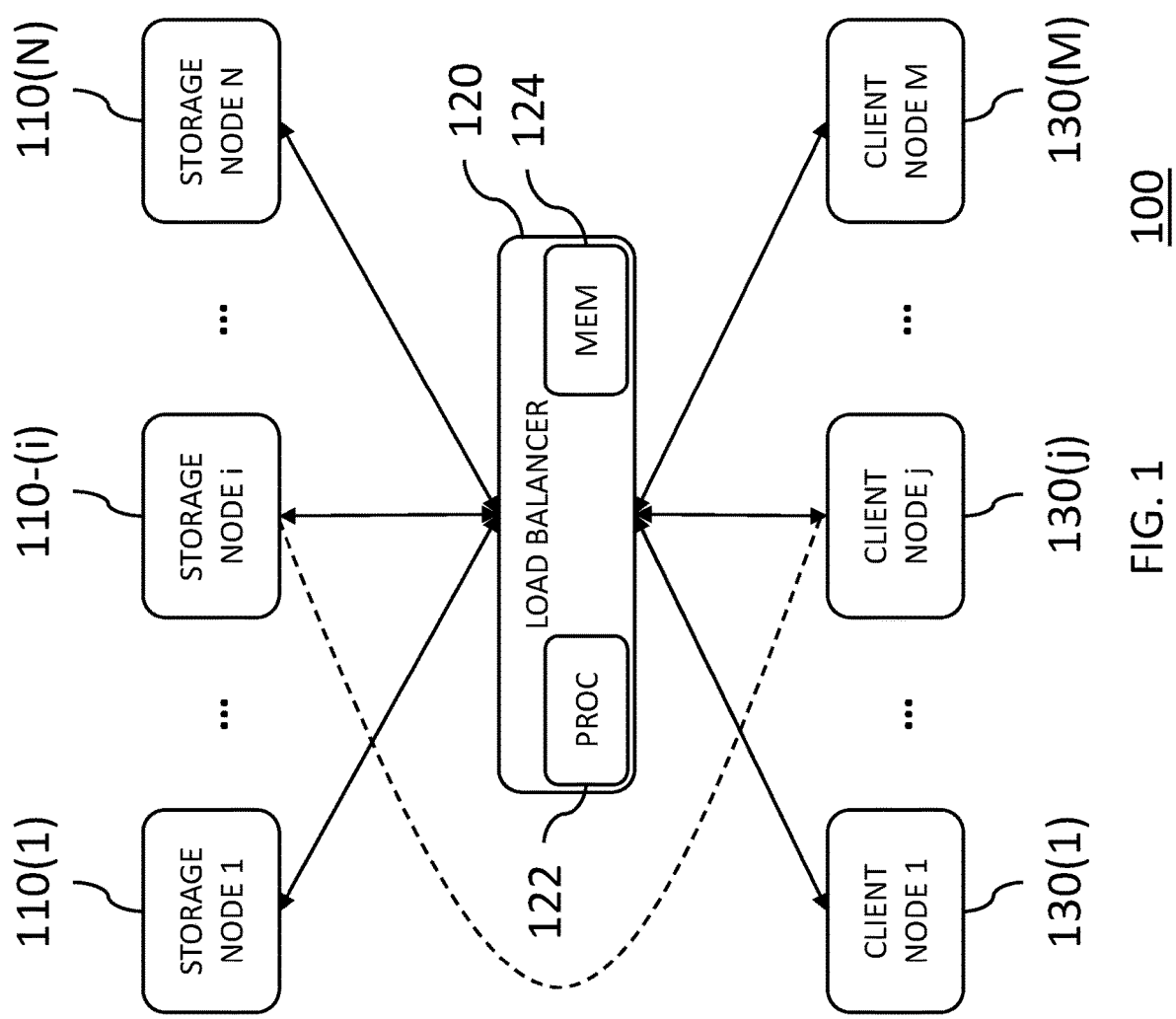
FIG. 1 is a block diagram of a content delivery network according to certain embodiments of the disclosure.

FIG. 1 is a block diagram showing a portion of a content delivery network (CDN) 100 according to certain embodiments of the disclosure. As shown in FIG. 1, network 100 has N content origin nodes 110, a load balancer 120, and M client nodes 130, where N is an integer greater than 1 and M is a positive integer. Although FIG. 1 shows a single load balancer 120, those skilled in the art will understand that network 100 may have one or more additional load balancers, each of which supports a potentially different set of one or more client nodes and the same set of N content origin nodes 110. In some implementations, one or more of the client nodes 130 may be CDN caching servers for other nodes not shown in FIG. 1.

As indicated by the solid arrows in FIG. 1, each client node 130 is capable of communicating with the load balancer 120, and the load balancer 120 is also capable of communicating with each content origin node 110. In addition, as indicated by the dashed line, each client node 130 is also capable of communicating directly with each content origin node 110.

As shown in FIG. 1, the load balancer 120 includes a programmable processor 122 and a memory 124, which contains program code, which, when executed by the processor 122, enables the load balancer 120 to provide its load balancing functionality. Although not explicitly shown in FIG. 1, each content origin node 110 and each client node 130 have analogous processors and memories that enable those nodes to provide their respective functionalities.

In general, the load balancer 120 receives content requests from the client nodes 130 and distributes those content requests to the different content origin nodes 110 in some equitable manner. In response, the content origin nodes 110 transmit responses back to the load balancer 120, which transmits redirect messages to the requesting client nodes 130, whether or not the content origin nodes 110 that received the content requests from the load balancer 120 contain the requested content. The client nodes 130 then transmit content requests to the content origin nodes 110 indicated in the redirect messages without involving the load balancer 120, which content origin nodes 110 respond by transmitting the requested content to the client nodes 130 again without involving the load balancer 120. In this way, the load balancer 120 does not have to handle the forwarding of the requested content from the content origin nodes 110 to the client nodes 130. This redirect processing may be achieved in a number of different embodiments.

Figure 2:
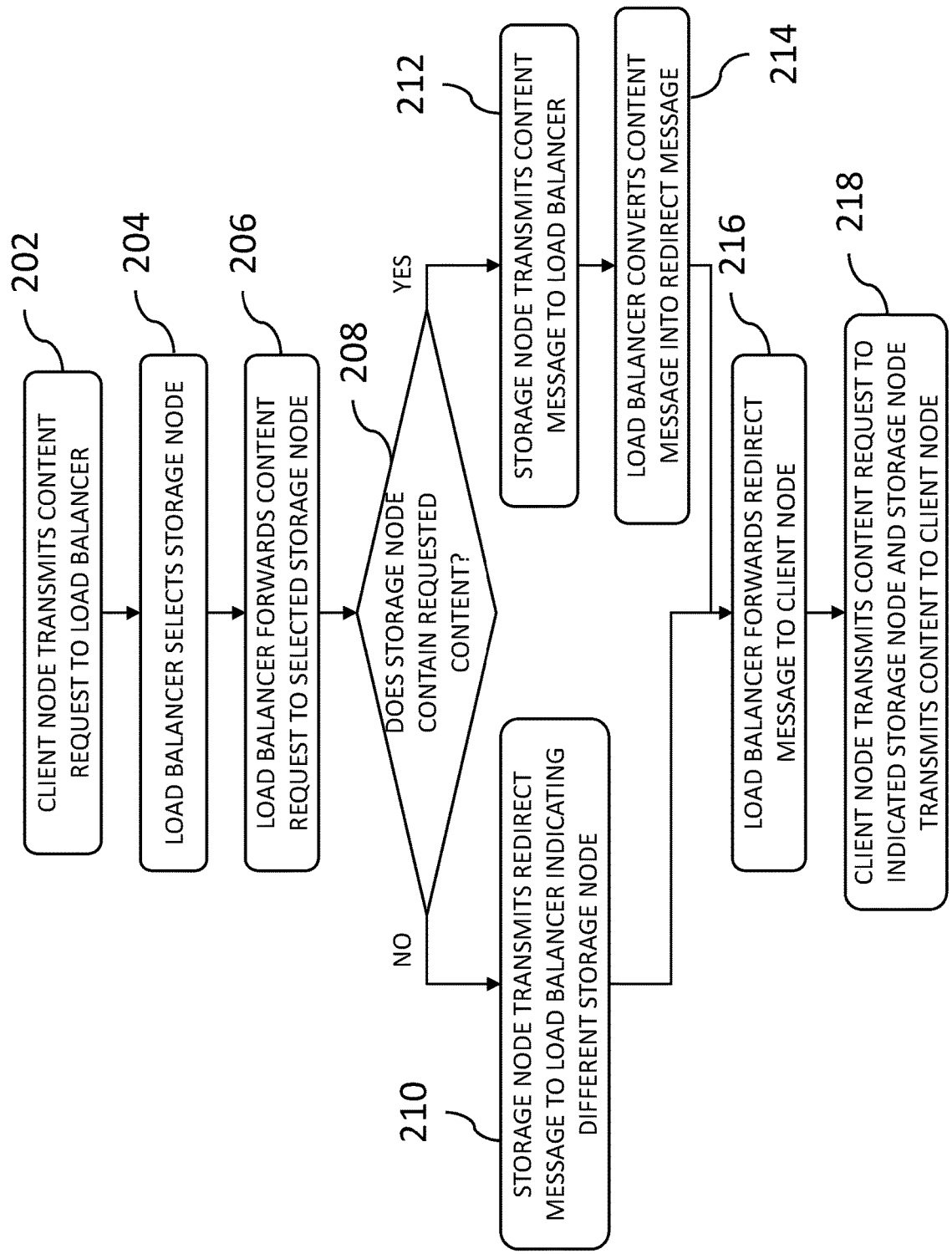
FIG. 2 is a flow diagram of a first embodiment of the redirect processing of the present disclosure.

FIG. 2 is a flow diagram of a first embodiment of the redirect processing of the present disclosure, in which the content origin nodes 110 may be, but do not have to be, legacy content origin nodes and/or the client nodes 130 may be, but do not have to be, legacy client nodes.

In step 202, a client node 130(j) transmits a content request to the load balancer 120. In step 204, the load balancer 120 selects a content origin node 110(i). In step 206, the load balancer 120 forwards the content request to the selected content origin node 110(i). In step 208, the content origin node 110(i) determines whether it contains the requested content. If not, then, in step 210, the content origin node 110(i) transmits a redirect message to the load balancer 120 indicating a different content origin node 110 that does contain the requested content. Processing then proceeds to step 216.

Alternatively, if the selected content origin node 110(i) does contain the requested content, then, in step 212, the content origin node 110(i) transmits a content message containing the requested content to the load balancer 120. In step 214, the load balancer 120 converts the content message into a redirect message indicating the selected content origin node 110(i) as the content origin node that does contain the requested content. Note that the load balancer 120 ignores the requested content that is in the payload of the content message received from the content origin node 110(i) when converting the content message into the redirect message. Processing then proceeds to step 216.

In step 216, the load balancer 120 forwards the redirect message (from either step 210 or step 214) to the client node 130(j). In step 218, the client node 130(j) transmits a content request to the content origin node 110 indicated in the redirect message, and that content origin node 110 transmits the content to the client node 130(j) without involving the load balancer 120.

Note that steps 202-212 and 216-218 may be similar to corresponding conventional steps performed using legacy content origin nodes 110 and a legacy client node 130(j). What is different is the load balancer 120 converting the content message received from the selected content origin node 110(i) into a redirect message for the client node 130(j) even though the selected content origin node 110(i) contains the requested content. By having the load balancer 120 redirect the client node 130(j) to the same, selected content origin node 110(i), the result is reduced processing by the load balancer 120 and possibly lower latency in the delivery of the requested content to the client node 130(j).

In one possible implementation:

The content request transmitted from the client node 130(j) to the load balancer 120 is an HTTP GET request;

The content request transmitted from the load balancer 120 to the selected content origin node 110(*i*) is an HTTP HEAD request, where the load balancer 120 converts the HTTP get request received from client node 130(*j*) into the HTTP HEAD request transmitted to the content origin node 110(*i*);

The content message transmitted from the selected content origin node 110(*i*) to the load balancer 120 is an HTTP 200 message; and The redirect message transmitted from the load balancer 120 to the client node 130(*j*) is an HTTP Redirect message, wherein the load balancer 120 converts the HTTP 200 message received from the content origin node 110(*i*) into the HTTP Redirect message for the entire requested content, thereby ignoring the content in the HTTP 200 message.

Figure 3:
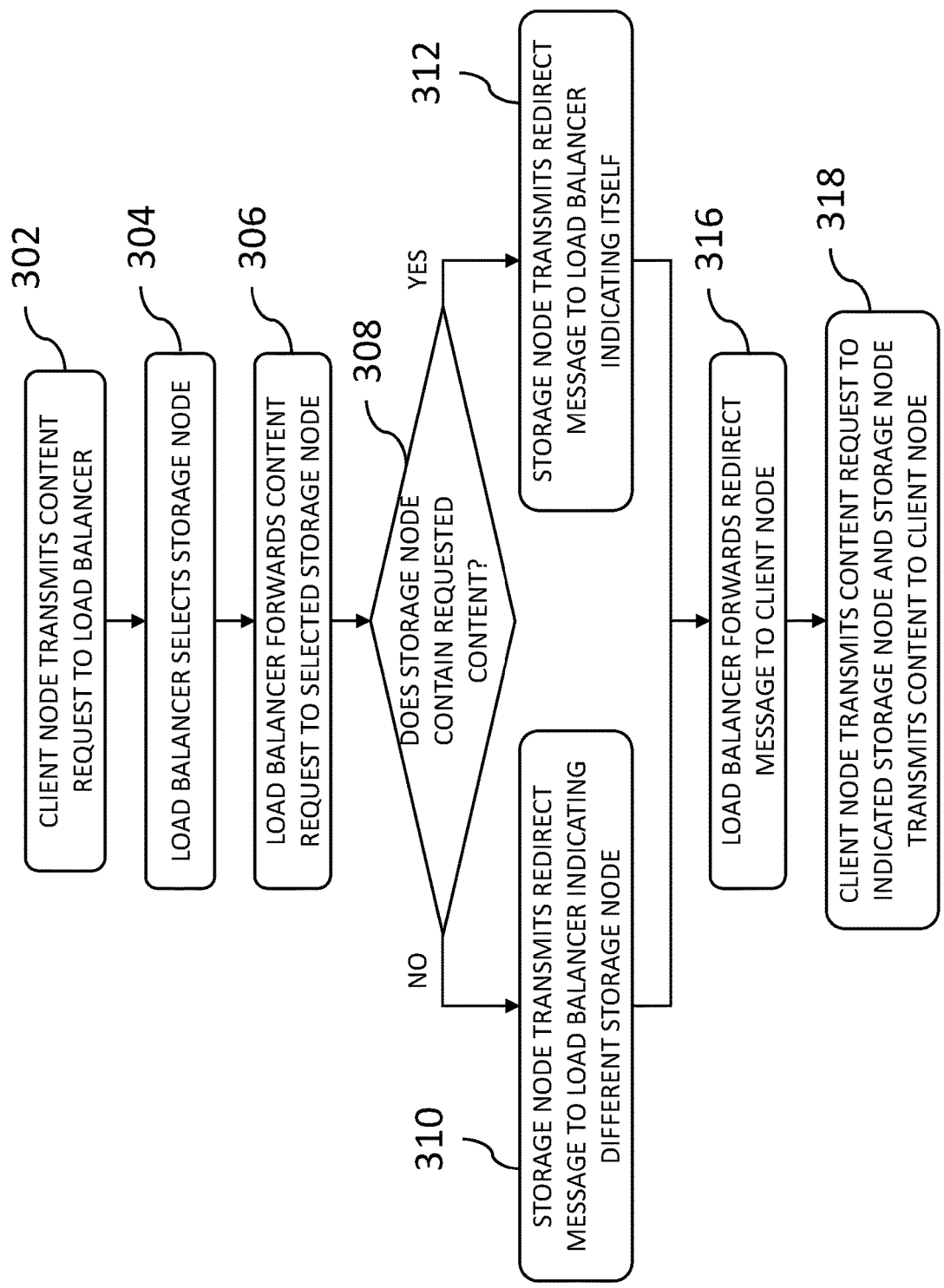
FIG. 3 is a flow diagram of a second embodiment of the redirect processing of the present disclosure.

FIG. 3 is a flow diagram of a second embodiment of the redirect processing of the present disclosure, in which the load balancer 120 may be, but does not have to be, a legacy load balancer and/or the client nodes 130 may be, but do not have to be, legacy client nodes.

In step 302, a client node 130(*j*) transmits a content request to the load balancer 120. In step 304, the load balancer 120 selects a content origin node 110(*i*). In step 306, the load balancer 120 forwards the content request to the selected content origin node 110(*i*). In step 308, the content origin node 110(*i*) determines whether it contains the requested content. If not, then, in step 310, the content origin node 110(*i*) transmits a redirect message to the load balancer 120 indicating a different content origin node 110 that does contain the requested content. Processing then proceeds to step 316.

Alternatively, if the selected content origin node 110(*i*) does contain the requested content, then, in step 312, the content origin node 110(*i*) transmits a redirect message indicating the selected content origin node 110(*i*) as the content origin node that does contain the requested content. Processing then proceeds to step 316.

In step 316, the load balancer 120 forwards the redirect message (from either step 310 or step 312) to the client node 130(*j*). In step 318, the client node 130(*j*) transmits a content request to the content origin node 110 indicated in the redirect message, and that content origin node 110 transmits the content to the client node 130(*j*) without involving the load balancer 120.

Note that steps 302-310 and 316-318 may be similar to corresponding conventional steps performed using a legacy load balancer 120 and a legacy client node 130(*j*). What is different is the selected content origin node 110(*i*) transmitting a redirect message to the load balancer 120 even though the selected content origin node 110(*i*) contains the requested content. By having the selected content origin node 110(*i*) redirect the client node 130(*j*) to the same, selected content origin node 110(*i*), the result is reduced processing by the load balancer 120 and possibly lower latency in the delivery of the requested content to the client node 130(*j*).

In one possible implementation:
The content request transmitted from the client node 130(*j*) to the load balancer 120 is an HTTP GET request;

The content request transmitted from the load balancer 120 to the selected content origin node 110(*i*) is an HTTP HEAD request, where the load balancer 120 converts the HTTP GET request received from the client node 130(*j*) into the HTTP HEAD request transmitted to the content origin node 110(*i*); and The redirect message transmitted from the selected content origin node 110(*i*) to the load balancer 120 and then from the load balancer 120 to the client node 130(*j*) is an HTTP Redirect message for the entire requested content.

In certain implementations, one or more of the following features may apply:
The load balancer 120 can run on a bare metal server or as a virtual instance;

The load balancer 120 may run a routing daemon with Border Gateway Protocol and advertise the same Anycast IP address;

Equal Cost Multipath (ECMP) may be enabled on neighbor routers (not shown in FIG. 1) employed to achieve network connectivity;

Using an ECMP hash implemented at the neighbor routers, client nodes 130 will be routed to the appropriate Loadbalancer instance; and A monitoring service like system or Monit can be used to monitor the daemons on the load balancer 120 to ensure only healthy load balancers are responding to client requests. These health checks can be used to restore service on the load balancer 120, if there is an issue.

Those skilled in the art will understand that the network of FIG. 1 with either the embodiment of FIG. 2 or the embodiment of FIG. 3 can be implemented in a wide variety of contexts including (without limitation) Cloud DVR systems, Video on Demand (VOD) systems, linear video delivery systems, and any suitable file delivery system.

In certain embodiments, the present disclosure is a system comprising a plurality of content origin nodes, a load balancer, and a client node, wherein the load balancer is configured to transmit, to a selected content origin node of the plurality, a first content request based on a first request for first requested content received from the client node; the selected content origin node is configured to transmit, to the load balancer, a first response to the first content request, wherein the selected content origin node has the first requested content; and the load balancer is configured to transmit, to the client node, a first redirect message identifying the selected content origin node as having the first requested content without transmitting the first requested content to the client node.

In at least some of the above embodiments, the selected content origin node is configured to transmit, to the load balancer, the first redirect message as the first response.

In at least some of the above embodiments, the first request is an HTTP GET request received from the client node; the first content request is an HTTP HEAD request, wherein the load balancer is configured to convert the HTTP GET request into the HTTP HEAD request and send the HTTP HEAD request to the selected content origin node; and the first redirect message is an HTTP Redirect message transmitted from the selected content storage node to the load balancer.

In at least some of the above embodiments, the first response from the selected content origin node contains the first requested content; and the load balancer is configured to convert the first response into the first redirect message.

In at least some of the above embodiments, the first request is an HTTP GET request received from the client node; the first content request is an HTTP HEAD request, wherein the load balancer is configured to convert the HTTP GET request into the HTTP HEAD request and send the HTTP HEAD request to the selected storage node; the first response is an HTTP 200 message received from the selected storage node; and the first redirect message is an HTTP Redirect message, wherein the load balancer is configured to convert the HTTP 200 message into the HTTP Redirect message and transmit the HTTP Redirect message to the client node.

In at least some of the above embodiments, the load balancer is further configured to transmit, to the selected content origin node, a second content request based on a second request for second requested content received from the client node; the selected content origin node is configured to transmit, to the load balancer, a second redirect message in response to the second content request; the selected content origin node does not have the second requested content; the second redirect message identifies a different content origin node as having the second requested content; and the load balancer is configured to transmit the second redirect message to the client node.

In at least some of the above embodiments, the system further comprises one or more additional client nodes configured to transmit requests for content to the load balancer, wherein the load balancer is configured to transmit corresponding content requests to selected content origin nodes of the plurality.

In at least some of the above embodiments, the system further comprises one or more additional load balancers configured to receive requests for content from clients nodes and transmit corresponding content requests to selected content origin nodes of the plurality.

In certain embodiments, the present disclosure is a content origin node for a system comprising a plurality of content origin nodes, a load balancer, and a client node, the content origin node comprising a memory containing program code and a processor configured to execute the program code to enable the content origin node to (i) receive, from the load balancer, a first content request for first requested content, wherein the content origin node has the first requested content and (ii) transmit, to the load balancer, a first redirect message identifying the content origin node as having the first requested content without transmitting the first requested content to the load balancer.

In at least some of the above embodiments, the first content request is an HTTP HEAD request; and the first redirect message is an HTTP Redirect message.

In certain embodiments, the present disclosure is a load balancer for a system comprising a plurality of content origin nodes, the load balancer, and a client node, the load balancer comprising a memory containing program code and a processor configured to execute the program code to enable the load balancer to (i) receive, from the client node, a first request for first requested content; (ii) transmit, to a selected content origin node of the plurality, a first content request based on the first request for the first requested content; (iii) receive, from the selected content origin node, a first response to the first content request, wherein the first response contains the first requested content; and (iv) transmit, to the client node, a first redirect message identifying the selected content origin node as having the first requested content without transmitting the first requested content to the client node.

In at least some of the above embodiments, the load balancer is configured to convert the first response into the first redirect message.

In at least some of the above embodiments, the first request is an HTTP GET request received from the client node; the first content request is an HTTP HEAD request, wherein the load balancer is configured to convert the HTTP GET request into the HTTP HEAD request and send the HTTP HEAD request to the selected storage node; the first response is an HTTP 200 message received from the selected storage node; and the first redirect message is an HTTP Redirect message, wherein the load balancer is configured to convert the HTTP 200 message into the HTTP Redirect message and transmit the HTTP Redirect message to the client node.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A system comprising:
a plurality of content origin nodes;
a load balancer; and a client node, wherein:
the load balancer is configured to transmit, to a selected content origin node of the plurality, a first content request based on a first request for first requested content received from the client node;
the selected content origin node is configured to transmit, to the load balancer, a first response to the first content request, wherein the selected content origin node has the first requested content; and
the load balancer is configured to transmit, to the client node, a first redirect message identifying the selected content origin node as having the first requested content without transmitting the first requested content to the client node.

2. The system of claim 1, wherein the selected content origin node is configured to transmit, to the load balancer, the first redirect message as the first response.

3. The system of claim 2, wherein:
the first request is an HTTP GET request received from the client node;
the first content request is an HTTP HEAD request, wherein the load balancer is configured to convert the HTTP GET request into the HTTP HEAD request and send the HTTP HEAD request to the selected content origin node; and
the first redirect message is an HTTP Redirect message transmitted from the selected content storage node to the load balancer.

4. The system of claim 1, wherein:
the first response from the selected content origin node contains the first requested content; and
the load balancer is configured to convert the first response into the first redirect message.

5. The system of claim 4, wherein:
the first request is an HTTP GET request received from the client node;
the first content request is an HTTP HEAD request, wherein the load balancer is configured to convert the HTTP GET request into the HTTP HEAD request and send the HTTP HEAD request to the selected storage node;
the first response is an HTTP 200 message received from the selected storage node; and
the first redirect message is an HTTP Redirect message, wherein the load balancer is configured to convert the HTTP 200 message into the HTTP Redirect message and transmit the HTTP Redirect message to the client node.

6. The system of claim 1, wherein:
the load balancer is further configured to transmit, to the selected content origin node, a second content request based on a second request for second requested content received from the client node;
the selected content origin node is configured to transmit, to the load balancer, a second redirect message in response to the second content request;
the selected content origin node does not have the second requested content;
the second redirect message identifies a different content origin node as having the second requested content; and
the load balancer is configured to transmit the second redirect message to the client node.

7. The system of claim 1, further comprising one or more additional client nodes configured to transmit requests for content to the load balancer, wherein the load balancer is configured to transmit corresponding content requests to selected content origin nodes of the plurality.

8. The system of claim 7, further comprising one or more additional load balancers configured to receive requests for content from clients nodes and transmit corresponding content requests to selected content origin nodes of the plurality.

9. A method for a system comprising a plurality of content origin nodes, a load balancer, and a client node, wherein:
the load balancer transmits, to a selected content origin node of the plurality, a first content request based on a first request for first requested content received from the client node;
the selected content origin node transmits, to the load balancer, a first response to the first content request, wherein the selected content origin node has the first requested content; and
the load balancer transmits, to the client node, a first redirect message identifying the selected content origin node as having the first requested content without transmitting the first requested content to the client node.

10. The method of claim 9, wherein the selected content origin node transmits, to the load balancer, the first redirect message as the first response.

11. The method of claim 10, wherein:
the first request is an HTTP GET request received from the client node;
the first content request is an HTTP HEAD request, wherein the load balancer converts the HTTP GET request into the HTTP HEAD request and send the HTTP HEAD request to the selected content origin node; and
the first redirect message is an HTTP Redirect message transmitted from the selected content storage node to the load balancer.

12. The method of claim 9, wherein:
the first response from the selected content origin node contains the first requested content; and
the load balancer converts the first response into the first redirect message.

13. The method of claim 12, wherein:
the first request is an HTTP GET request received from the client node;
the first content request is an HTTP HEAD request, wherein the load balancer converts the HTTP GET request into the HTTP HEAD request and sends the HTTP HEAD request to the selected storage node;
the first response is an HTTP 200 message received from the selected storage node; and
the first redirect message is an HTTP Redirect message, wherein the load balancer converts the HTTP 200 message into the HTTP Redirect message and transmits the HTTP Redirect message to the client node.

14. The method of claim 9, wherein:
the load balancer transmits, to the selected content origin node, a second content request based on a second request for second requested content received from the client node;
the selected content origin node transmits, to the load balancer, a second redirect message in response to the second content request;
the selected content origin node does not have the second requested content;
the second redirect message identifies a different content origin node as having the second requested content; and
the load balancer transmits the second redirect message to the client node.

15. A content origin node for a system comprising a plurality of content origin nodes, a load balancer, and a client node, the content origin node comprising a memory containing program code and a processor configured to execute the program code to enable the content origin node to:
- receive, from the load balancer, a first content request for first requested content, wherein the content origin node has the first requested content; and
- transmit, to the load balancer, a first redirect message identifying the content origin node as having the first requested content without transmitting the first requested content to the load balancer.

16. The content origin node of claim 15, wherein:
the first content request is an HTTP HEAD request; and
the first redirect message is an HTTP Redirect message.

17. A method for a content origin node for a system comprising a plurality of content origin nodes, a load balancer, and a client node, the method comprising the content origin node:
- receiving, from the load balancer, a first content request for first requested content, wherein the content origin node has the first requested content; and
- transmitting, to the load balancer, a first redirect message identifying the content origin node as having the first requested content without transmitting the first requested content to the load balancer.

18. The method of claim 17, wherein:
the first content request is an HTTP HEAD request; and
the first redirect message is an HTTP Redirect message.

19. A load balancer for a system comprising a plurality of content origin nodes, the load balancer, and a client node, the load balancer comprising a memory containing program code and a processor configured to execute the program code to enable the load balancer to:
- receive, from the client node, a first request for first requested content;
- transmit, to a selected content origin node of the plurality, a first content request based on the first request for the first requested content;
- receive, from the selected content origin node, a first response to the first content request, wherein the first response contains the first requested content; and
- transmit, to the client node, a first redirect message identifying the selected content origin node as having the first requested content without transmitting the first requested content to the client node.

20. The load balancer of claim 19, wherein the load balancer is configured to convert the first response into the first redirect message.

21. The load balancer of claim 20, wherein:
the first request is an HTTP GET request received from the client node;
the first content request is an HTTP HEAD request, wherein the load balancer is configured to convert the HTTP GET request into the HTTP HEAD request and send the HTTP HEAD request to the selected storage node;
the first response is an HTTP 200 message received from the selected storage node; and
the first redirect message is an HTTP Redirect message, wherein the load balancer is configured to convert the HTTP 200 message into the HTTP Redirect message and transmit the HTTP Redirect message to the client node.

22. A method for a load balancer for a system comprising a plurality of content origin nodes, the load balancer, and a client node, the method comprising the load balancer:
- receiving, from the client node, a first request for first requested content;
- transmitting, to a selected content origin node of the plurality, a first content request based on the first request for the first requested content;
- receiving, from the selected content origin node, a first response to the first content request, wherein the first response contains the first requested content; and
- transmitting, to the client node, a first redirect message identifying the selected content origin node as having the first requested content without transmitting the first requested content to the client node.

23. The method of claim 22, wherein the load balancer converts the first response into the first redirect message.

24. The method of claim 23, wherein:
the first request is an HTTP GET request received from the client node;
the first content request is an HTTP HEAD request, wherein the load balancer converts the HTTP GET request into the HTTP HEAD request and sends the HTTP HEAD request to the selected storage node;
the first response is an HTTP 200 message received from the selected storage node; and
the first redirect message is an HTTP Redirect message, wherein the load balancer converts the HTTP 200 message into the HTTP Redirect message and transmits the HTTP Redirect message to the client node.

* * * * *